March 19, 1929.  J. L. CREVELING  1,705,664
ELECTRIC SYSTEM
Original Filed April 7, 1920
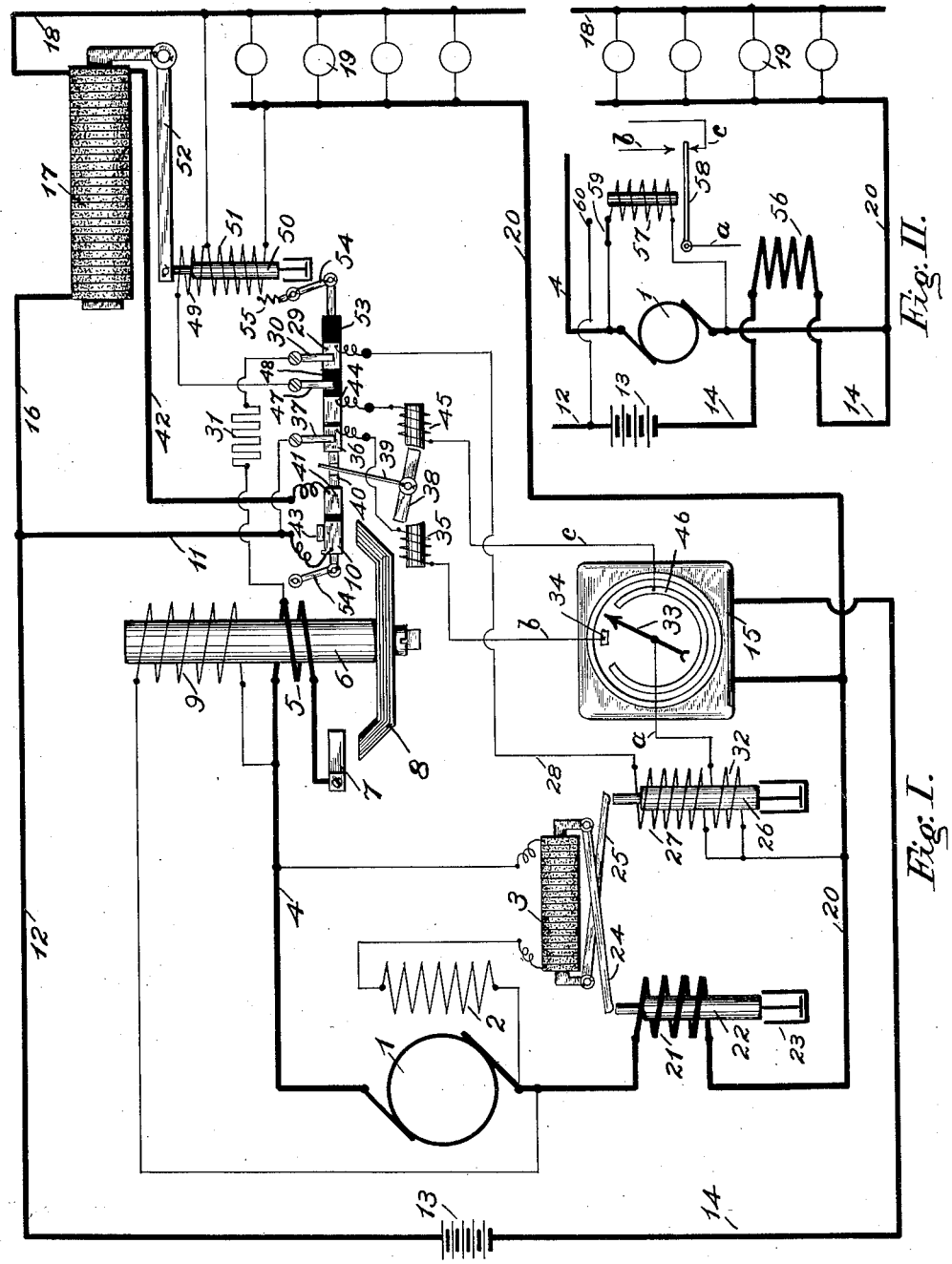
INVENTOR
John L. Creveling Patented Mar. 19, 1929.

1,705,664

UNITED STATES PATENT OFFICE.

JOHN L. CREVELING, OF TUCSON, ARIZONA, ASSIGNOR, BY MESNE ASSIGNMENTS, TO SIMPLEX EQUIPMENT COMPANY, INC., OF NEW YORK, N. Y., A CORPORATION OF DELAWARE.

ELECTRIC SYSTEM.

Application filed April 7, 1920, Serial No. 371,886. Renewed July 31, 1928.

My invention is particularly applicable to that class of electric systems wherein it is desired to operate lamps or other translating devices by means of a storage battery and a cooperating source of electrical potential difference wherein the source at times supplies current to the battery and at times to the translating devices which are operated by the battery when the source is ineffective to supply the same.

As my invention is very suitable for the lighting of railway cars having a dynamo or generator driven by the axle of the car and, therefore, subjected to wide variations in speed and intermittent operation corresponding to the movement of the car, it will be described with particular reference to such a system. But no means is shown for compensating for difference in direction of motion of the car as the particular means employed forms no part of my present invention and such devices are now well known in the art, which even contains many examples of driving means whereby the direction of rotation of the generator may even remain constant regardless of the direction of movement of the car.

Fig. I is a diagrammatic representation of one type of system employing an embodiment of my invention; and Fig. II diagrammatically represents certain modifications which may be made in the system illustrated in Fig. I to produce a modified form of embodiment of my invention.

In the drawing, a source of electrical potential difference is indicated as a generator 1, provided with a field energizing coil 2, having in series therewith a suitable type of regulating device or element in this case indicated as a carbon pile 3. It will therefore be evident that the electrical operation of the source may be governed by proper manipulation of the pressure upon the pile 3. The generator has its positive lead 4 connected with one end of the winding 5 surrounding the core 6 of a suitable main switch, the operation of which will hereinafter be more fully explained. The opposite end of the coil 5 is connected with the contact member 7, adapted to form an electrical connection with the switch contact 8 when the same is raised, as by upward movement of the core 6, by the coil 9 when the voltage across the generator becomes equal to or slightly in excess of that of the storage battery. The switch member 8 when raised is adapted to connect the member 7 with the contact member 10 when the latter member is in the position indicated in the drawing. And the said member 10 is connected as by the lead 11 with the battery main 12 which is carried to the positive side of the storage battery 13, the negative side of which is connected as by main 14 with one terminal of a suitable metering device 15, the opposite terminal of which is connected to the lead 20 which is carried to one end of the solenoid 21, the opposite end of which is connected with the negative terminal of the generator 1. The lead 11 is also connected as by main 16 with one terminal of a suitable translating circuit regulator, in this instance indicated at 17 as of the carbon pile variety. The opposite terminal of the said regulator is connected with the main 18 of the translating circuit, communicating with the positive terminals of the translating devices 19 which have their negative terminals connected with the main 20, through which return is made to the generator 1. The coil 21 is provided with a core 22 which the said coil tends to raise when energized, while too sudden movement is resisted by the dashpot 23. 24 is a lever which may be raised by upward movement of the core 22 so as to decrease the pressure upon the pile 3. 25 is a similar lever adapted to decrease the pressure upon the pile when raised as by upward movement of the core 26 which is surrounded by the coil 27 tending to raise the same. The coil 27 has one of its terminals connected with the negative lead 20, while its opposite terminal is connected as by wire 28 with the insulated movable contact member 29 which, when in the position indicated in the drawing, is in contact with the wiper 30 which is connected with one end of the resistance 31, the opposite end of which is connected in any desired manner with the positive lead 4 of the generator or with a suitable part of the system communicating with the said lead as, for example, the coil 5. It will therefore be noted that the coil 27 is in shunt across the generator through the resistance 31 when the contact 29—30 is made. 32 is a coil surrounding the core 26 and tending when energized to assist the coil 27 in raising the said core. One end of the coil 32 is connected with the lead 20, while the other end is connected as by the wire $a$ with the indicating hand 33 of the meter 15, which hand is considered in the drawing as being a contact device insulated from the other parts of the meter and capable, when moved in a counter-clockwise direction, of causing contact with the member 34 which is connected as by wire $b$ with one end of the winding of the magnet 35, the opposite end of which is connected with the insulated contact 36 which, when in the position shown in the drawing, is in electrical communication with the wiper 37, connected with the lead 11. Therefore, if 33 be moved into contact with 34, and the other members of the system be in the positions shown in the drawing, coil 32 will be placed across the generator, when the main switch is closed, through the magnet 35 which when energized tends to attract one end of the pivoted armature 38 and, if the said armature be in the position shown in the drawing, to revolve the same in a counter-clockwise direction so as to bend the leaf spring 39, engaging the member 40, in such manner as to tend to move the member 40 in a left-hand direction. The member 40 carries the several live contact members 10, 41, 36, 44, 29 and dead contacts 48 and 53 and is movably supported as by the links 54, one of which is provided with a snap compression spring 55 which tends to swing its link 54 in either a right or left-hand direction after the link is swung slightly to the right or left of a vertical position. And, as shown in the drawing, the spring 55 holds the contact members in their right-hand positions and is restrained from moving the said members further than desired by the block or stop 43. If these various instrumentalities be in the position shown in the drawing, and the magnet 35 be excited, the same will draw its end of the armature 38 downwardly and, through the instrumentality of the spring 39, shift the member 40 and the contact members carried thereby in a left-hand direction. And after that point is reached that the links 54 are swung beyond the vertical, the snap spring 55 will complete the act of swinging the contacts to the left until arrested by the member 41 coming in contact with the member or stop 43. The contact member 44, in the position shown in the drawing, is not engaged by any of the wipers and is connected with one end of the electromagnet 45 which has its opposite terminal connected as by wire $c$ with the contact member 46 adapted to make contact with the member 33 when the same is revolved in a clockwise direction. The member of insulating material 48, when in the position shown in the drawing, is engaged by the wiper 47 connected with one end of the winding 49, the opposite end of which is connected with the lead 18. The said winding 49, when energized, tends to lift the core 50 and thus assist its main operating winding 51 which is in shunt across the translating circuit. The core 50 operates the lever 52 so as to properly control the resistance 17 to maintain the voltage upon the translating devices constant within very narrow limits, in a well known manner.

In that modification shown in Fig. II, the coil 21 is suppressed and the coil 56, in series with the battery circuit, used in its stead to operate the core 22; while there is shown a coil 57 which may be connected by means of switch 59 either across the generator circuit as shown or across the battery circuit, if the switch be shifted on to the contact 60. The voltage coil 57 operates the lever 58 to change the connections between the wire $a$ and the wires $b$ and $c$, which are connected in the same manner as the same wires are connected in Fig. I.

An operation of my invention is substantially as follows:

If the various parts to be in the positions shown in the drawing and the generator be at rest, current will be supplied to the translating devices by the storage battery 13, through lead 12, main 16, regulator 17 and main 18; and return from the translating devices will be made through the lead 20 to the meter 15, and from thence through lead 14 to the battery 13. And the meter 15 is so arranged that the hand 33 will move in a clockwise direction and indicate the amperehours discharge of the battery. And when sufficient current has been used, the indicator 33 will make contact with 46; but, with the parts in the positions shown in the drawing, this will have no effect as the member 44 is in open circuit position.

If, now, the generator be started and its voltage brought up until slightly in excess of that of the battery, coil 9 will raise the plunger 6 and the switch member 8 will connect the member 7 with the member 10. And if the generator speed be sufficient, current will flow through lead 4, coil 5 tending to hold the switch closed, contact 7, member 8, contact 10, lead 11 to the translating devices, through main 16, regulator 17, main 18, translating devices 19, lead 20 and coil 21 to the generator; and also from lead 11, through battery main 12, battery 13, main 14, meter 15, lead 20 and coil 21 to the generator. The current flowing through the coil 21 will tend to raise the core 22. And I so arrange these members that, so long as the current supplied by the generator remain below a predetermined desired maximum, the core 22 will remain in the position shown in the drawing; while if the current tend to increase above this amount appreciably, coil 21 will lift the core 22 smoothly against the action of dashpot 23 and raise the lever 24 in such manner as to relieve the pressure upon the pile 3 and, by cutting down the current in the coil 2, regulate the generator to prevent this maximum desired current from being exceeded. Current will also flow from the lead 4, through resistance 31, wiper 30, contact 29 and wire 28 to the coil 27. And I so proportion the resistance 31 that, if the generator tend to exceed a predetermined desired voltage, coil 27 will raise the core 26 and, by lifting lever 25, so manipulate the regulator 3 that this desired voltage will not be appreciably exceeded. And, in one employment of my invention, I choose such a voltage as the maximum as will be required to deliver a small charging current to the battery 13 when the same is in a fully charged condition, though other adjustments may be used, if preferred, as will hereinafter appear.

The charging current passing through the meter 15 causes the hand 33 to move in a counter-clockwise direction. And I so arrange the meter that, when the battery was received that charge necessary to bring it to a fully charged condition, the hand 33 will make contact with the member 34 whereupon current will flow from the lead 11, through wiper 37, contact 36, electromagnet 35, wire *b*, contact 34, hand 33, wire *a* and coil 32 to the negative lead 20. This current flowing through the magnet 35 will attract the armature 38 and bend the leaf spring 39 so that the same tends to swing the member 40 and the contact members carried thereby in a left-hand direction; but it will be restrained from so doing as long as the main switch remains closed and the member 8 is held firmly against the contact member 10 which it presses against the stop 43. I so arrange the coil 32 that the current now flowing through said coil, by assisting the coil 27, raises the core 26 and lever 25 so as to increase the resistance 3 and cut down the voltage of the generator until the main switch is allowed to open and the contact member 8 falls into the position shown in the drawing. The dropping of the member 8 will allow the spring 39 to quickly move the member 40 and all of the contacts carried thereby in a left-hand direction. And after the member 40 is sufficiently moved that link 54 is on the opposite side of the vertical plane, the snap spring 55 will complete the operation of swinging the member 40 and the contact members carried thereby into their extreme left-hand position, when member 41 will occupy the position now occupied by the member 10 and be restrained from further movement in this direction by the member 43. And the wiper 37 will open the circuit at 36—37 which will suppress the current in the coil 32 and allow the core 26 to descend and the generator to pick up gradually until the proper voltage is reached, when coil 9 will again close the main switch and bring the member 8 into contact with the member 41, whereupon the generator will be connected through main 42 directly with the translating circuit main 18. The left-hand movement of the contact 29 brings the wiper 30 upon the blank segment 53, while the contact member 29 comes into contact with the wiper 47, whereupon the coil 27 has its connection through 31 with the generator circuit broken and a connection through wiper 47 and coil 49 to the translating circuit established. And I so arrange coil 49 that its resistance, when thrown in series with the coil 27, causes the said coil 27 to be able to raise the core 26 at a lower voltage than the said coil was able to raise the core through the resistance 31. And I so arrange these coils that 27 will now be able to so manipulate the core 26 as to hold substantially the normal translating circuit voltage upon the generator 1; while the slight assistance given to the coil 51 by the current flowing in the weak coil 49 will cause the same to operate the core 50 to tend to hold a slightly lower voltage upon the translating circuit by increasing the resistance 17. Therefore, as the current from the generator rises until sufficient to supply the translating circuit, the core 50 will be raised and the resistance 17 so increased as to practically cut off all discharge current from the battery to the translating devices which will be supplied directly by the generator at their proper translating circuit voltage.

If, now, the generator slow down, coil 27 will allow the core 26 to descend and endeavor to hold the translating circuit voltage upon the generator until the same has decreased the resistance 3 to a minimum. Then, if the generator is unable to supply the full voltage, some current will flow from the battery to the translating devices and, as the generator voltage sinks, coil 51 will allow the core 50 to descend and lessen the resistance 17 so as to shift the load from the generator on to the battery. And, if the generator speed fall sufficiently, the main switch will open and the contact member 8 will assume the position shown in the drawing; and the slight current in the coil 49 will cause the coil 51 to hold the voltage upon the translating devices 19 a very slight amount lower than when the coil 49 is cut out, but not sufficiently so to cause an appreciable difference in luminosity of the lamps. If, now, sufficient current be drawn from the battery that it be desired to recharge the same, the hand 33 will come into contact with member 46, whereupon current will flow from the lead 11, through wiper 37, member 44, coil 45, wire *c*, member 46, hand 33, coil 32 to lead 20. And if the switch be open, as indicated in the drawing, the current in the magnet 45 will cause the same to attract the armature 38 into the position shown in the drawing; and the spring 39, with the assistance of the spring 55, will quickly bring the member 40 and the contacts carried thereby into the position shown in the drawing. Then, if the generator be started, the operation will be repeated as first above outlined. However, should sufficient current be discharged from the battery while the main switch 8 remains closed and the generator is connected with the member 41, directly with the translating devices, as above outlined, the current flowing through the coil 32 will cause the same, together with the coil 37, to raise the core 26 and cut down the generator output until the main switch opens, when spring 39 will throw the various contacts into the positions shown in the drawing and then allow the generator to pick up again and the main switch close in contact with member 10, and the system will be operating as above pointed out.

The meter 15 is preferably so arranged that it allows more current to be put into the battery for a given motion of the hand 33 than is taken from it to produce a like degree of motion in the opposite direction. And, therefore, the inefficiency of the battery is more or less compensated for. But, if the battery becomes fully charged before the hand 33 comes upon the stop 34, the charging current will taper off to a desired minimum as the voltage of the battery approaches that held from being exceeded by the coil 27, if such an adjustment be chosen, as above outlined. However, if it be desired, the resistance 31 may be sufficient that coil 27 will not operate to move the core 26 upon any voltage to be met in the proper charging of the battery 13 provided it be operating properly. But the coil 27 may be used to prevent any appreciable rise beyond the maximum voltage desired for charging so as to prevent the generator voltage from exceeding a protective value, as for example upon breaking of one of the battery leads or high resistance in the battery connections.

If the coil 56, shown in Fig. II, be substituted for the coil 21 in the system of Fig. I, the operation will be the same as pointed out above with respect to Fig. I with the exception that the current held from exceeding a predetermined limit by manipulation of the resistance 3 will be the battery charging current instead of the total generator current, as mentioned with respect to the operation of Fig. I.

If desired, the meter 15 may be suppressed and a voltage coil 57, as shown in Fig. II, used in its stead. Such a coil may be connected either across the generator, as indicated by the switch 59, in the position shown in Fig. II, or directly across the battery circuit as when the switch 59 is brought in contact with the member 60. With such an arrangement, the coil 57 may be so arranged as to leave the armature 58 in the position shown in Fig. II, establishing electrical connection between the wire $a$ and the wire $c$ until a certain voltage is reached, when 58 will be raised, breaking the contact at $c$ and connecting the wire $a$ with the wire $b$. Therefore, if the coil 57 and its armature 58 be properly arranged, the battery may be charged until it reaches its fully charged voltage whereupon 57 may raise 58 and complete the circuit through wire $b$ and cause the generator output to be cut down and reduced to zero, whereupon the main switch will open and the generator will be connected directly with the translating circuit, as described above when this action was brought about by the meter 15.

From the foregoing it will be noted that I have produced a system wherein when the battery becomes charged the connection of the generator is automatically shifted from the battery charging circuit to the translating circuit which circuit it supplies at the normal translating voltage while the battery is restrained from materially discharging, and that the change of connections of the generator is brought about through the instrumentality of the main switch which requires but few and simple additional parts.

Further, it will be noted that breaking of a battery lead or opening of the battery circuit will not allow the generator to produce any excessive voltage which might damage the system, and that while the system need not be voltage governed while charging the battery it may be very delicately governed to avoid voltage changes across the translating circuit when the generator is connected directly therewith.

Further, it will be noted that I have provided means whereby the regulation of the voltage upon the translating circuit is shifted from the translating circuit regulator to the generator regulator, and vice versa, without necessitating fluctuation in the luminosity of the lamps or deleteriously affecting other translating devices. While I have shown means for changing the connection of the voltage responsive coil 27 from one side of the lamp regulator 17 to the other and means for changing the adjustment of said voltage coil, as well as means for controlling the connection of coil 49 so as to adjust the lamp regulator, I have, in this application, made no claim to these instrumentalities since they are claimed in my copending application Serial No. 383,750, which is a continuation of the present application, in so far as these features are concerned.

I do not wish in any way to limit myself to the exact constructions indicated in this specification nor to the exact modes of operation above outlined, which are given to illustrate embodiments of my invention, for it will be obvious that wide departure in details of construction and operation may be made without departing from the spirit and scope of my invention, which is as set forth in the following claims.

I claim:

1. The combination with a source of electrical potential difference, a storage battery circuit and a translating circuit, of an automatic switch for connecting and disconnecting the source comprehending means whereby the same connects the source with the battery circuit under certain conditions and with the translating circuit under other conditions.

2. The combination with a source of electrical potential difference, a storage battery circuit and a translating circuit, of an automatic switch for connecting and disconnecting the source comprehending means whereby the same connects the source with the battery circuit under certain conditions and with the translating circuit under other conditions, and means for determining which connection said switch shall make.

3. The combination with a source of electrical potential difference, a strong battery circuit and a translating circuit, of an automatic switch for connecting and disconnecting the source comprehending means whereby the same connects the source with the battery circuit under certain conditions and with the translating circuit under other conditions, means for determining which connection said switch shall make, and automatic means affected by the source for controlling said last named means.

4. The combination with a source of electrical potential difference, a storage battery circuit and a translating circuit, of an automatic switch for connecting and disconnecting the source comprehending means whereby the same connects the source with the battery circuit under certain conditions and with the translating circuit under other conditions, means for determining which connection said switch shall make, and automatic means for controlling said last named means depending upon the state of charge of the battery.

5. The combination with a source of electrical potential difference, a storage battery circuit and a translating circuit, of an automatic switch for connecting and disconnecting the source comprehending means whereby the same connects the source with the battery circuit under certain conditions and with the translating circuit under other conditions, means for determining which connection said switch shall make, and automatic means for controlling said last named means depending upon the current supplied to the battery.

6. The combination with a source of electrical potential difference, a storage battery circuit and a translating circuit, of an automatic switch for connecting and disconnecting the source comprehending means whereby the same connects the source with the battery circuit under certain conditions and with the translating circuit under other conditions, means for determining which connection said switch shall make, and automatic means for controlling said last named means depending upon the current taken from the battery.

7. The combination with a source of electrical potential difference, a storage battery circuit and a translating circuit, of an automatic switch for connecting and disconnecting the source comprehending means whereby the same connects the source with the battery circuit under certain conditions and with the translating circuit under other conditions, means for determining which connection said switch shall make, and automatic means for controlling said last named means depending upon the current supplied to and delivered by the battery.

8. The combination with a source of variable electrical potential difference, a storage battery circuit and a translating circuit of automatic means adapted to connect the source with one of said circuits when the potential difference reaches a predetermined value, and means for affecting a portion of said automatic means to determine which connection shall be made.

9. The combination with a source of variable electrical potential difference, a storage battery circuit and a translating circuit, of automatic means adapted to connect the source with one of said circuits when the potential difference reaches a predetermined value, and automatic means affected by the source for affecting a portion of said first-named automatic means to determine which connection shall be made.

10. The combination with a source of variable electrical potential difference, a storage battery circuit and a translating circuit, of automatic means adapted to connect the source with one of said circuits when the potential difference reaches a predetermined value, and automatic means for affecting a portion of said first-named automatic means to determine which connection shall be made depending upon the current supplied to the battery.

11. The combination with a source of variable electrical potential difference, a storage battery circuit and a translating circuit, of automatic means adapted to connect the source with one of said circuits when the potential difference reaches a predetermined value, and automatic means for affecting a portion of said first-named automatic means to determine which connection shall be made depending upon the current supplied by the battery.

12. The combination with a source of variable electrical potential difference, a storage battery circuit and a translating circuit, of automatic means adapted to connect the source with one of said circuits when the potential difference reaches a predetermined value, and automatic means for affecting a portion of said first-named automatic means to determine which connection shall be made depending upon the current supplied to and by the battery.

13. The combination with a source of variable electrical potential difference, a storage battery circuit and a translating circuit, of automatic means adapted to connect the source with one of said circuits when the potential difference reaches a predetermined value, and automatic means for affecting a portion of said first-named automatic means to determine which connection shall be made depending upon the state of charge of the battery.

14. The combination with a variable source of electrical potential difference, a storage battery charged thereby, a translating circuit deriving current from the battery, a regulating device connecting the battery with the translating circuit, and an automatic switch comprehending in its structure means for operating the same when the potential difference reaches a predetermined value and to connect the source on opposite sides of said regulating device.

15. The combination with a variable source of electrical potential difference, a storage battery charged thereby, a translating circuit deriving current from the battery, a regulating device connecting the battery with the translating circuit, and an automatic switch comprehending in its structure means for operating the same when the potential difference reaches a predetermined value and to connect the source on opposite sides of said regulating device, and means for determining which connection shall be made.

16. The combination with a variable source of electrical potential difference, a storage battery charged thereby, a translating circuit deriving current from the battery, a regulating device connecting the battery with the translating circuit, an automatic switch comprehending in its structure means for operating the same when the potential difference reaches a predetermined value and to connect the source on opposite sides of said regulating device, and automatic means for determining which connection shall be made depending upon the state of charge of the battery.

17. The combination with a variable source of electrical potential difference, a storage battery charged thereby, a translating circuit deriving current from the battery, a regulating device connecting the battery with the translating circuit, an automatic switch comprehending in its structure means for operating the same when the potential difference reaches a predetermined value and to connect the source on opposite sides of said regulating device, and automatic means for determining which connection shall be made depending upon the current supplied to the battery.

18. The combination with a variable source of electrical potential difference, a storage battery charged thereby, a translating circuit deriving current from the battery, a regulating device connecting the battery with the translating circuit, an automatic switch comprehending in its structure means for operating the same when the potential difference reaches a predetermined value and to connect the source on opposite sides of said regulating device, and automatic means for determining which connection shall be made depending upon the current supplied by the battery.

19. The combination with a variable source of electrical potential difference, a storage battery charged thereby, a translating circuit deriving current from the battery, a regulating device connecting the battery with the translating circuit, an automatic switch comprehending in its structure means for operating the same when the potential difference reaches a predetermined value and to connect the source on opposite sides of said regulating device, and automatic means for determining which connection shall be made depending upon the current supplied to and by the battery.

20. The combination with a variable speed dynamo, a storage battery circuit and a translating circuit connected together through a regulating device, of an automatic switch adapted to close the dynamo circuit when its voltage reaches a predetermined value and to open the circuit when its voltage falls below a predetermined value, said switch comprehending in its structure means whereby it connects the dynamo on one side of said regulating device under certain conditions and on the other side thereof under other conditions.

21. The combination with a variable speed dynamo, a storage battery circuit and a translating circuit connected together through a regulating device, of an automatic switch adapted to close the dynamo circuit when its voltage reaches a predetermined value and to open the circuit when its voltage falls below a predetermined value, said switch comprehending in its structure means whereby it connects the dynamo on one side of said regulating device under certain conditions and on the other side thereof under other conditions, said means being responsive to the state of charge of the storage battery.

22. The combination with a variable speed dynamo, a storage battery circuit and a translating circuit connected together through a regulating device, of an automatic switch adapted to close the dynamo circuit when its voltage reaches a predetermined value and to open the circuit when its voltage falls below a predetermined value, said switch comprehending in its structure means whereby it connects the dynamo on one side of said regulating device under certain considerations and on the other side thereof under other conditions, the operation of said means depending upon the amount of current supplied to the battery.

23. The combination with a variable speed dynamo, a storage battery circuit and a translating circuit connected together through a regulating device, of an automatic switch adapted to close the dynamo circuit when its voltage reaches a predetermined value and to open the circuit when its voltage falls below a predetermined value, said switch comprehending in its structure means whereby it connects the dynamo on one side of said regulating device under certain conditions and on the other side thereof under other conditions, the operation of said means depending upon the amount of current supplied by the battery.

24. The combination with a variable speed dynamo, a storage battery circuit and a translating circuit connected together through a regulating device, of an automatic switch adapted to close the dynamo circuit when its voltage reaches a predetermined value and to open the circuit when its voltage falls below a predetermined value, said switch comprehending in its structure means whereby it connects the dynamo on one side of said regulating device under certain conditions and on the other side thereof under other conditions, the operation of said means depending upon the amount of current supplied to and by the battery.

25. The combination with a source of electerical potential difference tending to vary, a storage battery circuit and a translating circuit, automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions, of means whereby said regulating means causes the current from the source to be reduced to a predetermined value to allow shifting the connection of the source from one circuit to the other, as above mentioned, so that the shifting of connections will be accomplished at a time when no substantial current is flowing through said connections.

26. The combination with a variable speed generator, a storage battery charged thereby, means for regulating the generator, voltage responsive means for controlling said regulating means to limit the voltage supplied by the generator, of means responsive to generator voltage cooperating with the first named voltage responsive means to operate said regulator, and means for controlling the second named voltage responsive means affected by the state of charge of the storage battery.

27. The combination with a variable speed generator, a storage battery charged thereby, means for regulating the generator, voltage responsive means for controlling said regulating means to limit the voltage supplied by the generator, of means responsive to generator voltage cooperating with the first named voltage responsive means to operate said regulator, and means for controlling the second named voltage responsive means affected by the current supplied to the battery.

28. The combination with a variable speed generator, a storage battery charged thereby, means for regulating the generator, voltage responsive means for controlling said regulating means to limit the voltage supplied by the generator, of means responsive to generator voltage cooperating with the first named voltage responsive means to operate said regulator, and means for controlling the second named voltage responsive means affected by the current supplied by the battery.

29. The combination with a variable speed generator, a storage battery charged thereby, means for regulating the generator, voltage responsive means for controlling said regulating means to limit the voltage supplied by the generator, of means responsive to generator voltage cooperating with the first named voltage responsive means to operate said regulator, and means for controlling the second named voltage responsive means affected by the current supplied to and by the battery.

30. The combination with a source of electrical potential difference and a plurality of circuits adapted to be supplied thereby, of an automatic switch responsive to changes in said potential difference for connecting said source singly with said circuits, and means affected by current in one of said circuits cooperating with said switch to select the circuit to be connected with said source.

31. The combination with a storage battery, a source of electrical potential difference and a plurality of circuits adapted to be supplied thereby, of an automatic switch for connecting said source singly with said circuits, and automatic means cooperating therewith to select the circuit to be connected with said source depending upon the state of charge of the storage battery.

32. The combination with a storage battery, a source of electrical potential difference and a plurality of circuits adapted to be supplied thereby, of an automatic switch for connecting said source singly with said circuits, and automatic means cooperating with said switch to select the circuit to be connected with said source depending upon the current supplied to the battery.

33. The combination with a storage battery, a source of electrical potential difference and a plurality of circuits adapted to be supplied thereby, of an automatic switch for connecting said source singly with said circuits, and automatic means cooperating therewith to select the circuit to be connected with said source depending upon the current supplied by the battery.

34. The combination with a storage battery, a source of electrical potential difference and a plurality of circuits adapted to be supplied thereby, of an automatic switch for connecting said source singly with said circuits, and automatic means cooperating therewith to select the circuit to be connected with said source depending upon the current supplied to and by the battery.

JOHN L. CREVELING.